United States Patent
Vigneras

(10) Patent No.: US 11,874,758 B2
(45) Date of Patent: Jan. 16, 2024

(54) HIGH-PERFORMANCE MECHANISM FOR GENERATING LOGGING INFORMATION WITHIN APPLICATION THREAD IN RESPECT OF A LOGGING EVENT OF A COMPUTER PROCESS

(71) Applicant: BULL SAS, Les Clayes sous Bois (FR)

(72) Inventor: Pierre Vigneras, Angervilliers (FR)

(73) Assignee: BULL SAS, Les Clayes sous Bois (FR)

( * ) Notice: Subject to any disclaimer, the term of this patent is extended or adjusted under 35 U.S.C. 154(b) by 87 days.

(21) Appl. No.: 15/510,638

(22) PCT Filed: Aug. 25, 2015

(86) PCT No.: PCT/FR2015/052267
§ 371 (c)(1),
(2) Date: May 30, 2017

(87) PCT Pub. No.: WO2016/038272
PCT Pub. Date: Mar. 17, 2016

(65) Prior Publication Data
US 2017/0255540 A1    Sep. 7, 2017

(30) Foreign Application Priority Data

Sep. 10, 2014 (FR) .................... 1458511

(51) Int. Cl.
*G06F 11/34* (2006.01)
*G06F 9/48* (2006.01)
*G06F 9/54* (2006.01)
*G06F 11/30* (2006.01)

(52) U.S. Cl.
CPC .......... *G06F 11/3476* (2013.01); *G06F 9/485* (2013.01); *G06F 9/542* (2013.01); *G06F 11/302* (2013.01); *G06F 11/3003* (2013.01); *G06F 11/3068* (2013.01); *G06F 11/3404* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,870,588 A | * | 2/1999 | Rompaey | G06F 30/3308 703/13 |
| 6,256,775 B1 | * | 7/2001 | Flynn | G06F 9/3851 712/E9.053 |
| 7,086,064 B1 | | 8/2006 | Stevens | |

(Continued)

OTHER PUBLICATIONS

International Search Report for PCT/FR2015/052267 dated Dec. 21, 2015 with English translation.

(Continued)

*Primary Examiner* — Meng Ai T An
*Assistant Examiner* — Zujia Xu
(74) *Attorney, Agent, or Firm* — Meagher Emanuel Laks Goldberg & Liao, LLP

(57) ABSTRACT

Some embodiments are directed to a logging within a software application executed over an assembly of information processing devices. More particularly, some embodiments relate to a method allowing process logging in the case of a software application operating with several processes and/or threads.

8 Claims, 1 Drawing Sheet

(56) References Cited

U.S. PATENT DOCUMENTS

| | | | |
|---|---|---|---|
| 7,661,036 B1* | 2/2010 | Clingenpeel | G06F 11/3476 |
| | | | 714/37 |
| 8,499,299 B1 | 7/2013 | Jakab et al. | |
| 8,667,472 B1 | 3/2014 | Molinari | |
| 9,384,112 B2* | 7/2016 | Petersen | G06F 11/0709 |
| 2003/0120706 A1* | 6/2003 | Harjula | G06F 9/45533 |
| | | | 718/104 |
| 2008/0250412 A1* | 10/2008 | Clark | G06F 9/52 |
| | | | 718/102 |
| 2009/0106594 A1* | 4/2009 | Zhang | G06F 11/3476 |
| | | | 714/37 |
| 2013/0024875 A1* | 1/2013 | Wang | G06F 9/542 |
| | | | 719/318 |
| 2013/0036404 A1 | 2/2013 | Shu et al. | |
| 2013/0238882 A1* | 9/2013 | Suzuki | G06F 9/30043 |
| | | | 712/228 |
| 2013/0305359 A1* | 11/2013 | Gathala | G06F 21/56 |
| | | | 726/22 |
| 2014/0058908 A1* | 2/2014 | Gupta | G06Q 30/04 |
| | | | 705/30 |
| 2014/0237474 A1* | 8/2014 | Branton | G06F 9/4881 |
| | | | 718/102 |

OTHER PUBLICATIONS

Written Opinion for PCT/FR2015/052267 dated Dec. 21, 2015 with English translation.
Monajjemi, Valiallah, et al., "Drums: A Middleware-Aware Distributed Robot Monitoring System", 2014 Canadian Conference on Computer and Robot Vision, IEEE, May 6, 2014, pp. 211-218.

* cited by examiner

HIGH-PERFORMANCE MECHANISM FOR GENERATING LOGGING INFORMATION WITHIN APPLICATION THREAD IN RESPECT OF A LOGGING EVENT OF A COMPUTER PROCESS

CROSS REFERENCE TO RELATED APPLICATION

This application is a National Phase filing under 35 C.F.R. § 371 of and claims priority to PCT Patent Application No.: PCT/FR2015/052267, filed on Aug. 25, 2015, which claims the priority benefit under 35 U.S.C. § 119 of French Application No.: 1458511, filed on Sep. 10, 2014, the contents of which are hereby incorporated in their entireties by reference.

BACKGROUND

Some embodiments relate to the field of the process logging within a software application executed over an assembly of information processing devices. More particularly, some embodiments relate to a method allowing process logging in the case of a software application operating with several processes and/or threads.

"Logging" is a mechanism allowing information to be exported in the course of execution of a software application for the attention of the developer, of the tester, or of other members of a technical team responsible for the software application. This information allows certain malfunctions to be detected, or, the latter being known, their cause to be determined and their correction to be facilitated. The exportation of the logging information may be carried out during development phases of the software application, or in a testing phase within a community of testers, but also in the production phase. The logging information is then exported to the users of the application, but may be "reported back" in one way or another to the technical team responsible for the software.

The logging information may be exported to a display terminal or to a memory, notably a mass memory "hard disk" type.

Certain "critical" software applications need highly constrained response times but require a large quantity of calculations. In order to reconcile these two demands, they are conventionally deployed on systems composed of an assembly of information processing devices. Recourse is then made to parallel programming techniques in order to take advantage of these processing devices.

However, despite this parallelism, which may be massive, reconciling the response time and the processing of a very large quantity of calculations remains a serious constraint.

Moreover, the logging requires inputs/outputs to a display terminal or to a memory, as examples. The input/output mechanisms are costly in terms of processing time. As a consequence, the logging has an impact on the performance of a software application.

In the framework of a critical software application, it is even very often chosen not to carry out any logging in order not to reduce its performance. The result of this is then a difficulty in the detection and correction of the malfunctions of this software application.

SUMMARY

Some embodiments are therefore beneficial over the related art by providing mechanisms that allow an efficient logging, including for critical software applications, notably parallel software applications.

Some embodiments thereby provide a logging method that includes:

Executing a process that includes at least one application thread and at least one logging thread over an assembly of information processing devices;

Detecting, within the at least one application thread, a logging event and immediately transmitting first logging information to said at least one logging thread;

Receiving said first logging information and generating second logging information starting from said first logging information; and, Publishing said second logging information, via a publication interface to at least one processing element, registered with said at least one logging thread.

Some embodiments therefore include one or more of the following features which may be used separately or in partial combination with one another or in total combination with one another:

said at least one processing element includes an output thread belonging to said process.

said at least one processing element includes a thread of a logging process distinct from said process.

said application thread transmits said first information to said at least one logging thread asynchronously via a communications interface.

said communications interface and said publication interface are of the socket type and conform to the ZeroMQ library.

at the start of said process, said at least one application thread waits for the initialization of said at least one logging thread before continuing with its execution, and in which said logging thread initializes itself by synchronizing itself with a sub-set of said at least one processing element.

said first logging information include a name and a level.

when said process is duplicated, said at least one logging thread is terminated, then restarted within the initial parent process.

when said at least one logging thread receives a signal, it publishes second logging information associated with said signal, then triggers the processing code associated with said signal.

when said application thread receives a signal, it transmits first logging information associated with said signal to said at least one logging thread, waits for a given time, then causes the termination of said process.

Other features and advantages of the invention will become apparent upon reading the description that follows of one embodiment preferred of the invention, given by way of example and with reference to the appended drawings.

DETAILED DESCRIPTION OF THE EMBODIMENTS

From a software perspective, a software application is composed of one or more processes.

A "process" may be seen as a program being executed by an information processing system (or computer). A process may be defined as including:

- A set of instructions to be executed, which may be in the read-only memory, but most often downloaded from the mass memory to the random access memory;
- An addressing space in a random access memory for storing the stack, the working data, etc.;
- Resources such as the network ports.

The same process may include several threads (or tasks or light processes). As opposed to a process, a thread does not dispose of its own virtual memory but shares it with all the threads of the same process.

Figure 1:
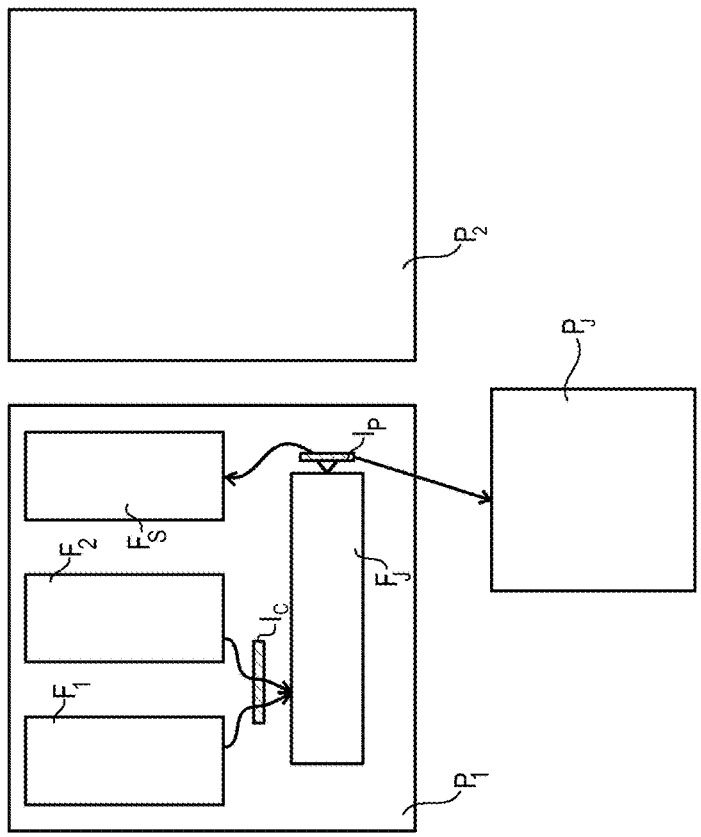
FIG. 1 shows schematically one exemplary embodiment of the invention.

In the example illustrated by FIG. 1, an application includes two processes $P_1$, $P_2$. The process $P_1$ includes three threads $F_1$, $F_2$, $F_3$. Although not shown in the figure, the process $P_2$ may also include several threads.

It should be noted that the threads may have a lifetime different from that of the processes, and, a fortiori, from the duration of execution of the application: the threads may be executed dynamically in the course of execution of the process and terminated at any moment, once the task for which they are provided is finished. FIG. 1 therefore illustrates a situation at a given moment in the execution of the software application.

In the following, the threads $F_1$, $F_2$ will be called "application threads", in order to distinguish them from the logging thread or threads $F_J$ and from the output thread $F_s$ which will be described hereinbelow.

The information processing system allowing the software application to be executed is typically a parallel system formed from an assembly of information processing devices.

Each information processing device may for example be a microprocessor with associated circuits (memory, etc.), and the system is then formed from an assembly of inter-connected microprocessors. Another example is that of a single microprocessor forming a system, and composed of an assembly of physical cores. Such a microprocessor is generally called "multi-core".

Irrespective of the architecture implemented, the processes $P_1$, $P_2$, $P_J$ of the example in FIG. 1 and the threads that they include may be executed in parallel.

When the process P1 starts up, at least one thread also starts up. This first thread can subsequently launch the execution of other threads. These threads may of course be application threads (in other words belonging to the application and allowing the "logic" of the application to be implemented), but also notably logging threads $F_J$.

In the following, as illustrated in FIG. 1, only one logging thread is described. It is however possible to provide several logging threads, notably in order to enable a distribution of loading.

According to one embodiment, when the logging thread starts up, it creates:

- A communications interface $I_C$, allowing the reception of first logging information from the application threads $F_1$, $F_2$, in other words from the main application thread and from any potential threads that it might subsequently create;
- A publication interface $I_P$ allowing second logging information to be published to processing elements.

Here, "processing elements" refers to the threads and the processes. In FIG. 1, as will be seen later on, the logging process $P_J$ and the output thread $F_S$ form such processing elements which are capable of receiving the logging information.

According to one embodiment of the invention, these interfaces are of the "socket" type. A "socket" is a communication mechanism well known to those skilled in the art, developed on the operating systems of the "Unix" type, but today present under the majority of operating systems.

They may for example conform to ZeroMQ. ZeroMQ is a platform of the "middleware" type which is inserted between the underlying operating system and the applications in order to provide additional infrastructure services that are independent of the operating system. With respect to concurrent platforms such as CORBA (Common Object Request Broker Architecture), for example, ZeroMQ provides a great facility of use and excellent performance characteristics: the code is very short for the application threads, leading to little processing overload, and the processing within the ZeroMQ library itself is also very fast. Accordingly, ZeroMQ complies with the requirements of the invention and allows the desired services to be fulfilled without any additional processing that may be detrimental.

The mechanisms offered by ZeroMQ are notably accessible through a library using application code in C language. The mechanisms and advantages of the invention are therefore accessible for processes developed in C language.

According to one embodiment, the communications interface $I_C$ is an asynchronous interface: it allows the application thread to send out logging information, then to continue with its processing, without having to wait for an acknowledgement from the logging thread $F_J$.

In the framework of an implementation using ZeroMQ, this communications interface $I_C$ may be of the push/pull type. In this case, upon start-up, the logging thread creates a socket of the "pull" type. The application threads $F_1$, $F_2$ may then transmit the logging information via a socket of the "push" type connected to the "pull" socket of the logging thread $F_J$.

Between the two types of sockets forming the communications interface $I_C$, an inter-thread and intra-process transport protocol such as the "inproc" protocol may be established. This protocol allows the transmission of messages between threads within the same process: the information is directly transmitted by the memory belonging to the context associated with the process. This mechanism does not therefore generate any inputs/outputs, and hence contributes to the high performance of the method according to the invention.

The publication interface $I_P$ may include a socket of the "pub" type created within the logging thread $F_J$. The processing elements (processes or threads) $P_J$, $F_S$ can create sockets of the "sub" type in order to subscribe to the "pub" socket of the logging thread $P_J$. The "publish-subscribe" model managed by ZeroMQ thus allows messages to be transmitted to all the processing elements already subscribed.

According to one embodiment of the invention, at the start of the process $P_1$, the application thread waits for the initialization of this logging thread $F_J$ before continuing with its execution.

When it launches the execution of the logging thread $F_J$, the (main) thread of the process $P_1$ can indicate a number of processing elements which must receive logging information. It will only receive an acknowledgement from the logging thread $F_J$ when this number of subscribed processing elements has been reached. Once the acknowledgement has been received, the thread can then continue with its execution.

Similarly, the logging thread $F_J$ is initialized by synchronizing itself with the number of processing elements which must receive logging information.

For this purpose, the logging thread $F_J$ can publish synchronization information. Upon receipt of this information, the processing elements having received it will transmit an acknowledgement to the logging thread. The latter can count the acknowledgements received and readily determine when the specified number is reached.

This synchronization phase allows it to be ensured that no logging information is lost: indeed, the establishment of the connection between the logging thread $F_J$ and the processing elements can take a certain time. Furthermore, the processing elements themselves may also be in the process of initialization. During this time, if the logging thread $F_J$ began to send out logging information immediately, the latter would be lost due to the absence of acknowledgement in the transmission of the logging information published by the receiving processing elements. This absence of acknowledgement allows good performance characteristics to be achieved.

However, in certain situations, it can be important, or even crucial, not to lose any logging information.

According to this implementation, it is therefore possible to specify the number of the processing elements for which the receipt of all of the synchronization information must be guaranteed by this synchronization mechanism.

This number of elements determines a sub-set of the set of subscribed processing elements because, once the initialization phase has finished, it is perfectly possible for other processing elements to subscribe to the publications of the logging thread $F_J$. However, the latter may miss the first publications of the logging thread $F_J$.

The logging method according to the invention includes a step for execution of the process $P_1$. As previously described, this execution involves the execution of at least one application thread $F_1$ and of one logging thread $F_J$. In the case of a process written in C language, this application thread $F_1$ may correspond to the execution of the function main( ).

Once the initialization phase has finished, the application thread or threads execute the code of the software application.

The method then consists in detecting, within the application thread or threads, a logging event and in immediately transmitting first logging information e1, e2 to the logging thread $F_J$.

The detection of a logging event is a technique known per se, which consists in inserting "loggers" into the code in order to trigger a logging event when certain conditions are met. These conditions may be quite simply the passage through a precise point in the code (in order to allow the sequence of operations of the code to be followed), or else a situation of error, etc.

This logging information generated by the application thread $F_1$, $F_2$ is here referred to as "first logging information" in order to distinguish it from the second logging information which will be that published by the logging thread $F_J$.

This information might only include a name and a level. According to one embodiment, this first information only includes this name and this level.

The name may be a chain of characters identifying a logger within the application code.

The level is generally an integer number, identifying a degree of criticality of the event. This level may belong to a previously-defined list which may include:

"Critical": to indicate a critical error which, in general, leads to the termination of the process.

"Error": to indicate a normal error.

"Warning": to indicate an unimportant error.

"Output": to indicate a normal message, not associated with an error.

"Info": to indicate a message for the attention of the user of the application (and not only for the developer or tester).

"Debug": to indicate a more detailed message, intended for the testers (or "debuggers") of the application.

"Trace": to indicate a message associated with the most detailed level. Its use is clearly intended for the development stage of the application.

This list is of course non-exhaustive. Many other levels may be defined by the developer of the application.

It is important that all the outputs intended for the developers or testers conform to this formalism in order to be taken into account by the mechanisms of the invention. It is notably therefore important for the developer to avoid direct outputs, notably by the printf( ) function of the C language: they may be replaced by the "Output" level for example.

This first information may also include:

a timestamp of the occurrence of the logging event;

an identifier of the process $P_1$;

other information on the execution context: identifier for the thread of the kernel, name of the software application, name of the file, number of the line of the application code, name of the function in the process of execution, etc.

According to the invention, the application thread immediately transmits this first logging information to the logging thread $F_J$ via the communications interface $I_C$. As was previously seen, this interface is asynchronous and does not require any acknowledgement. Nor is any lock installed, in such a manner that, once the transmission has been carried out (and without worrying about the receipt by the logging thread), the application thread $F_1$, $F_2$ can immediately continue with the application processing.

According to one embodiment, no other processing is applied between the detection of a logging event and the generation of the first logging information.

According to one embodiment, only a formatting processing operation is applied.

In no case, according to the invention, does the application thread set up inputs/outputs mechanisms: these mechanisms are implemented by the logging thread $F_J$, and hence transferred outside of the application thread $F_1$, $F_2$.

As a result, for the application thread, the extra cost is reduced to a minimum.

According to one embodiment of the invention, the application code is divided up into modules. Each module is associated with a name or identifier, which may be incorporated into the name of the logger.

For example, in a module "Module1", loggers with names "Module1.logger1", "Module1.logger2", etc.

This mechanism allows the various logging events to be more clearly named: at the end of a chain, the location in the code where the event has taken place may thus be directly determined as a function of the module name included in its name.

The logging thread $F_J$ receives in an asynchronous manner the first logging information generated by the application thread or threads $F_1$, $F_2$. Its role is then to generate second logging information starting from the first logging information received from the application threads, and, potentially, from complementary information. This complementary information may be information common to all of the application threads of the process.

The processing implemented by the logging thread $F_J$ may be limited to the generation of this second logging information. The generation may include, on the one hand, the addition of the potential complementary information, but also a conditioning, according to a predefined format allowing its exploitation by processing elements.

This formatting may be very simple and consist solely of a formatting such that the second information is in a format independent of the computer programming language used.

This second information is subsequently published by the logging thread $F_J$ via the publication interface $I_P$. It can then be received by one or more processing elements $F_s$, $P_J$ already registered with the logging thread, as previously described.

These processing elements may include an output thread $F_s$ belonging to the process $P_1$. This output thread may be designed to form an output of the second logging information on a display terminal (screen, etc.), in a file stored in a memory, notably a mass memory, etc.

These output mechanisms are generally costly in processing time owing to the interaction required with hardware and, in general, to the necessity for an acknowledgement (the thread must ensure that the information really has been stored on the hard disk, etc.).

Thanks to the invention, these mechanisms do not impact the application thread which follows its operating sequence in a manner parallel to that of the logging thread.

The processing elements may also include a logging process $P_J$ distinct from said process $P_1$.

This process may also implement output mechanisms in the same way as an output thread $F_s$.

It may also implement more complex mechanisms for exploitation of the logging information: filtering, etc.

According to one embodiment of the invention, when the process $P_1$ is duplicated, the logging thread $F_J$ and the potential output thread $F_s$ are terminated, then restarted within the initial parent process $P_1$. Within the daughter process, these two threads are not restarted (they go into a "finalized" state, as will be described hereinbelow). Indeed, very often, the daughter process will trigger the execution of a function "exec( )" which will replace and "crush" the content of the daughter process by a new program: it is therefore unnecessary to trigger an automatic restart of the logging and output threads, and it may even be counter-productive.

The duplication, or "fork", is the mechanism for creation of a new process in a software application operating under an operating system of the "Unix" type, or conforming to the Posix standard.

The duplication of a process including several threads ("multithreaded process") poses significant problems. This issue is notably described in the Posix standard, IEEE 1003.1, notably in the "Rationales" part.

The mechanism implemented by the invention allows it to be avoided.

Furthermore, a management of a state machine may be set up in order to best manage the duplications "fork( )".

Figure 2:
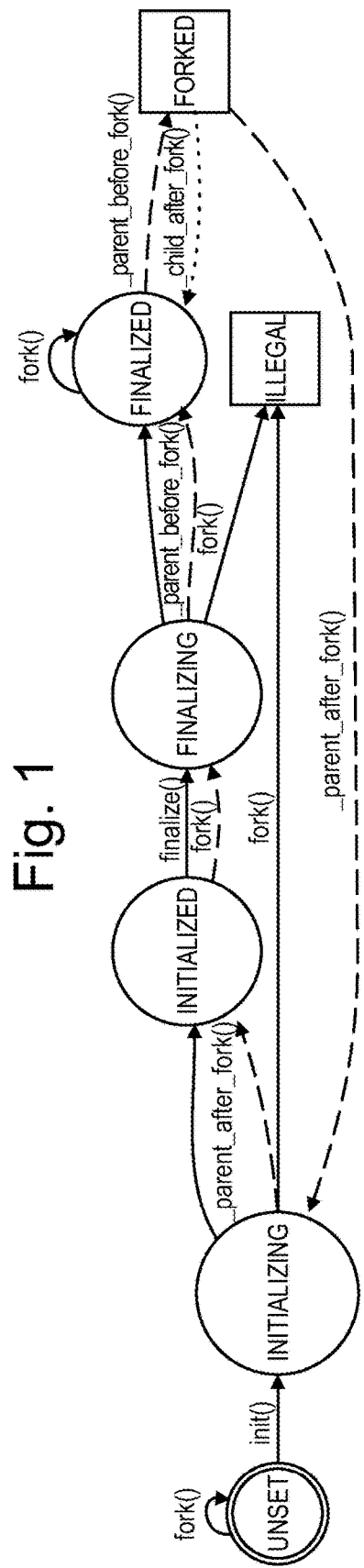
FIG. 2 shows schematically a finite state machine according to one embodiment of the invention.

FIG. 2 illustrates such a state machine of the logging thread $F_J$. It is considered that the thread $F_J$ can be in 5 main states. These states are conventional:

"unset", corresponding to an "unstarted" state, this corresponding to the state in which the thread may be before the application thread triggers its initialization.

"initializing", corresponding to an initialization state of the thread, during which the synchronization step previously described notably takes place.

"initialized", corresponding to the normal operation of the logging thread.

"finalizing", corresponding to the termination of the logging thread.

"finalized", corresponding to a state where the thread has finished.

In certain states, according to this embodiment of the invention, duplications are prohibited. This is the case for the "initializing" and "finalizing" states: the arrow "fork( )" leads to an "illegal" state.

In the particular states "unset" and "finalized", duplication may be permitted and not give rise to particular processing operations. The arrow "fork( )" loops back to the current state.

In the "initialized" state, the duplication brings the transition to the state "finalizing" in order to terminate the logging thread.

The same is true for the potential output thread $F_s$.

Once the thread has finished, the process can be duplicated.

Once the duplication has been carried out, the threads $F_J$ and $F_s$ may be restarted. In the parent process (in other words the initial process $P_1$), the threads are restarted in the state where they were prior to the duplication, in other words the "initialized" state. In the daughter process, the threads start in an "unset" state: the application thread of the daughter process must then launch its initialization in order to make it change state.

Furthermore, a process $P_1$ operating under a system of the Posix or unix type can receive signals. These signals may be provided for terminating the process, such as the signals SIGINT, SIGTERM, SIGQUIT, SIGSEGV, SIGBUS.

When such a signal is received by the logging thread $F_J$, the latter may choose to process them or not depending on their nature. For example, the signals SIGINT, SIGTERM and SIGQUIT may be considered as needing to be processed by the application thread and hence not considered by the logging thread. It may, on the other hand, consider other types of signals such as the signals SIGSEGV and SIGBUS.

Upon receiving such a signal, the logging thread $F_J$ may consider that this constitutes a logging event, and then publish logging information, associated with this signal.

Subsequently, it may once again trigger this signal and its "normal" processing. The normal processing of a signal is provided by a processing code, typically referred to as a "handler" and associated with this signal. The normal processing of this signal SIGSEGV or SIGBUS leads to the termination of the process.

Thus, by virtue of this mechanism, the process adopts the expected behavior consisting in coming to an end, but it is also ensured that a logging linked to the receipt of this event takes place: also, if a processing element is subscribed to the logging thread, it will be informed of the cause of the termination of the process $P_1$.

If a signal is received by the application thread, the latter may determine that it constitutes a logging event. For this purpose, a specific code may be associated with the signal as a "handler": upon receipt of a given signal, it is this specific code which is triggered by the operating system.

This specific code enables the immediate transmission of (first) logging information to the logging thread via the communications interface $I_C$.

The invention claimed is:

1. A logging method, comprising:
executing a process executed by an information processing system comprising at least one microprocessor with associated circuits, said process including at least one application thread belonging to an application to be monitored, the at least one application thread configured to execute the application, by performing application processing, and at least one logging thread over an assembly of information processing devices, said information processing system is configured to execute said processes, said at least one application thread and said at least one logging thread in parallel;
detecting, within the at least one application thread a logging event of the application, and immediately generating and transmitting first logging information upon detecting the logging event, from the at least one application thread, to the at least one logging thread, the detecting being performed by the at least one application thread;
wherein the at least one application thread transmits the first logging information to the at least one logging thread immediately in an asynchronous manner via a communications interface, wherein said communications interface uses an inter-thread and intra-process transport protocol that allows the first logging information to be directly transmitted by a memory belonging to context associated with the process;
receiving, at the at least one logging thread, the first logging information and generating, with the at least one logging thread, second logging information incorporating the first logging information; and
publishing, from the at least one logging thread, the second logging information via a publication interface to at least one processing element previously registered with the at least one logging thread, wherein the communications interface and the publication interface are of a socket type and conform to a ZeroMQ library; and
wherein once the transmission of the first logging information to the at least one logging thread has been carried out, the at least one application thread immediately continues with the application processing without confirming receipt by the at least one logging thread.

2. The method as claimed in claim 1, wherein the at least one processing element includes an output thread belonging to the process.

3. The method as claimed in claim 1, wherein the at least one processing element includes a thread of a logging process distinct from the process.

4. The method as claimed in claim 1, wherein, at a start of the process, the at least one application thread waits for a initialization of the at least one logging thread before continuing with its execution, and in which the at least one logging thread is initialized by synchronizing itself with the at least one processing element.

5. The method as claimed in claim 1, wherein the first logging information comprises a name and a level.

6. The method as claimed in claim 1, wherein, when the process is duplicated to transition the at least one logging thread from an initialized state to a finalizing state, the at least one logging thread is terminated, then restarted within an initial parent process.

7. The method as claimed in claim 1, wherein, when the at least one logging thread receives a signal, the at least one logging thread publishes the second logging information associated with the signal, then triggers a processing code associated with the signal.

8. The method as claimed in claim 1, wherein, when the at least one application thread receives a signal, the application thread transmits the first logging information associated with the signal to the at least one logging thread, waits for a given time, then causes a termination of the process.

* * * * *